US011541492B2

(12) United States Patent
Schlegel et al.

(10) Patent No.: US 11,541,492 B2
(45) Date of Patent: Jan. 3, 2023

(54) CLAMPING DEVICE WITH A WORK-PIECE ADAPTER APPARATUS AND A HOLDING APPARATUS (71) Applicant: MAG IAS GmbH, Eislingen (DE)

(72) Inventors: Thomas Schlegel, Kirchheim (DE); Hans-Dieter Bührle, Merklingen (DE); Rudi Kodalle, Oberboihingen (DE); Martin Lang, Gingen (DE)

(73) Assignee: MAG IAS GMBH, Eislingen (DE)

( * ) Notice: Subject to any disclaimer, the term of this patent is extended or adjusted under 35 U.S.C. 154(b) by 555 days.

(21) Appl. No.: 16/340,890

(22) PCT Filed: Oct. 10, 2017

(86) PCT No.: PCT/EP2017/075820
§ 371 (c)(1),
(2) Date: Apr. 10, 2019

(87) PCT Pub. No.: WO2018/069325
PCT Pub. Date: Apr. 19, 2018

(65) Prior Publication Data
US 2019/0232442 A1 Aug. 1, 2019

(30) Foreign Application Priority Data
Oct. 11, 2016 (DE) .................. 10 2016 219 728.2

(51) Int. Cl.
B23Q 1/00 (2006.01)
B23Q 16/00 (2006.01)
(Continued)

(52) U.S. Cl.
CPC ......... *B23Q 1/0081* (2013.01); *B23Q 1/0072* (2013.01); *B23Q 16/00* (2013.01); *B23B 31/1071* (2013.01); *B23Q 3/103* (2013.01)

(58) Field of Classification Search
CPC .... B23Q 1/0081; B23Q 1/0072; B23Q 16/00; B23B 31/1073; B23B 31/1078; B23B 31/1071
See application file for complete search history.

(56) References Cited

U.S. PATENT DOCUMENTS 8,123,233 B2 * 2/2012 Hofmann .............. B23B 31/107
279/4.12
8,256,773 B2 * 9/2012 Sandmeier ........... B23Q 1/0072
279/123
(Continued)

FOREIGN PATENT DOCUMENTS

CN 105 517 755 A 4/2016
DE 103 12 192 B3 8/2004
(Continued)

*Primary Examiner* — Mahdi H Nejad
(74) *Attorney, Agent, or Firm* — McGlew and Tuttle, P.C.

(57) ABSTRACT

A holding apparatus/workpiece adapter apparatus arrangement includes a holding apparatus and a workpiece adapter apparatus. The workpiece adapter apparatus is positioned and fixed, with a workpiece fastened thereto, by the holding apparatus. The holding apparatus has partially cylindrical positioning elements, which engage in an associated cylindrical positioning recess and a positioning slot and position the workpiece adapter apparatus in an x and a y direction. The workpiece adapter apparatus bears by mating contact surfaces against contact surfaces of the holding apparatus and is clamped by linearly displaceable clamping elements and pressed against the contact surfaces, and thus positioned in a z direction. For clamping, clamping surfaces of the clamping elements bear against mating clamping surfaces of the workpiece adapter apparatus.

20 Claims, 6 Drawing Sheets (51) Int. Cl.
*B23B 31/107* (2006.01)
*B23Q 3/10* (2006.01)

(56) References Cited

U.S. PATENT DOCUMENTS

| | | | |
|---|---|---|---|
| 9,302,359 B2 * | 4/2016 | Hediger | B23Q 1/0072 |
| 10,632,593 B2 * | 4/2020 | Zanni | B25B 5/087 |
| 2003/0168795 A1 * | 9/2003 | Fries | B23Q 1/0072 269/309 |
| 2004/0256780 A1 * | 12/2004 | Lang | B23Q 16/00 269/309 |
| 2007/0001407 A1 | 1/2007 | Bechteler | |
| 2009/0267281 A1 | 10/2009 | Kitamura et al. | |
| 2017/0021464 A1 * | 1/2017 | Traub | B23Q 3/105 |
| 2018/0001427 A1 * | 1/2018 | Hediger | B23Q 3/103 |
| 2018/0057278 A1 * | 3/2018 | Kunihiro | B23Q 7/1494 |

FOREIGN PATENT DOCUMENTS

| | | |
|---|---|---|
| DE | 10 2005 030820 B3 | 8/2006 |
| DE | 10 2005 033 468 A1 | 1/2007 |
| DE | 10 2008 005131 A1 | 7/2009 |
| EP | 1 078 713 A1 | 2/2001 |
| EP | 1 410 874 A1 | 4/2004 |
| EP | 1 595 641 A1 | 11/2005 |
| FR | 2 931 751 A1 | 12/2009 |
| WO | 2015/032602 A1 | 3/2015 |

* cited by examiner

CLAMPING DEVICE WITH A WORK-PIECE ADAPTER APPARATUS AND A HOLDING APPARATUS

CROSS REFERENCE TO RELATED APPLICATIONS

This application is a United States National Phase Application of International Application PCT/EP2017/075820 filed Oct. 10, 2017 and claims the benefit of priority under 35 U.S.C. § 119 of German patent application serial no. DE 10 2016 219 728.2, filed Oct. 11, 2016, the entire contents of which are incorporated herein by reference.

FIELD OF THE INVENTION

The invention relates to a holding apparatus for positioning and fixing a workpiece adapter apparatus, and to a workpiece adapter apparatus for positioning and fixing a workpiece by means of such a holding apparatus. The invention also relates to a holding apparatus/workpiece adapter apparatus arrangement.

BACKGROUND OF THE INVENTION

WO 2015/032 602 A1 discloses a workpiece adapter apparatus and an associated holding apparatus. The workpiece adapter apparatus comprises a holding body, on the first side of which a workpiece is able to be fixed and on the second side of which two cylindrical receptacles are formed. The workpiece adapter apparatus is placed byway of the receptacles on centering elements of the holding apparatus and positioned in this way. For fixing the workpiece adapter apparatus, the holding apparatus has swing clamps, which are rotatable about a pivot axis and, for fixing the workpiece adapter apparatus, engage in intermediate spaces of the holding body.

DE 10 2005 033 468 A1 discloses clamping apparatuses that are arranged on a machine bed. The clamping apparatuses have fixing elements that are firmly connected to a workpiece carrier. The fixing elements are oriented transversely to their longitudinal axis by means of a respective centering cone and are clamped by means of a respective radially displaceable clamping part. The respective clamping part has a wedge surface, which cooperates with an inclined surface of the associated fixing element. As a result of the fixing elements being clamped, the workpiece carrier fastened thereto is thus at the same time oriented in the direction of the longitudinal axes of the fixing elements and transversely to the longitudinal axes and positioned.

SUMMARY OF THE INVENTION

The invention is based on the object of creating a simple holding apparatus that allows exact and reliable positioning and fixing of a workpiece adapter apparatus.

This object is achieved by a holding apparatus for positioning and fixing a workpiece adapter apparatus, having a main body, two positioning elements for positioning the workpiece adapter apparatus in an x direction and a y direction extending perpendicularly to the x direction, which are arranged on the main body and are formed at least partially in a cylindrical manner, at least one planar contact surface for positioning the workpiece adapter apparatus in a z direction extending perpendicularly to the x direction and to the y direction, and a fixing device, arranged on the main body, for pressing the workpiece adapter apparatus against the at least one planar contact surface, which comprises at least one linearly displaceable clamping element having a clamping surface. For positioning a workpiece adapter apparatus, the holding apparatus has two positioning elements, which are formed at least partially in a cylindrical manner. The positioning elements are arranged fixedly on the main body, i.e. for example fastened to the main body by a screw connection and/or clamping connection and/or a materially bonded connection. The workpiece adapter apparatus is positioned in the x and the y direction such that a first positioning element engages in a positioning slot and a second positioning element engages in a cylindrical positioning recess in the workpiece adapter apparatus. The positioning elements have preferably a longitudinal center axis that extends parallel to the z direction. Preferably, the positioning elements are formed in a peg-like manner and have a cylindrical positioning portion and a frustoconical introduction portion. The positioning elements have a diameter d, wherein the following applies for the diameter d: 15 mm≤d≤45 mm, in particular 20 mm≤d≤40 mm, and in particular 25 mm≤d≤35 mm. As a result of the diameter d, sufficient stability and also low thermal expansion of the positioning elements are achieved. For positioning the workpiece adapter apparatus in the z direction, the holding apparatus has at least one planar contact surface, against which the workpiece adapter apparatus bears with at least one planar mating contact surface. The at least one planar contact surface extends preferably parallel to an x-y plane, which is defined by the x direction and the y direction. Preferably, the holding apparatus has at least two, in particular at least four planar contact surfaces, which lie in a common plane. The positioning in the z direction thus takes place independently of the positioning in the x and/or the y direction. The holding apparatus is thus configured such that the workpiece adapter apparatus is positioned in the x and the y direction independently of the positioning of the workpiece adapter apparatus in the z direction. The positioning elements serve only for positioning the workpiece adapter apparatus in the x direction and the y direction, whereas the at least one planar contact surface serves only for positioning the workpiece adapter apparatus in the z direction. By means of the fixing device, a workpiece adapter apparatus is pressed against the at least one planar contact surface and as a result fixed and finally positioned in the z direction. The at least one linearly displaceable clamping element makes the positioning and fixing easy, exact and reliable. The clamping surface of the at least one clamping element bears against at least one mating clamping surface of the workpiece adapter apparatus and is configured such that, with increasing linear displacement of the at least one clamping element, the workpiece adapter apparatus is increasingly pressed with the at least one mating contact surface against the at least one contact surface. At the same time as the fixing, the final positioning in the z direction thus takes place. The at least one clamping element is preferably linearly displaceable in a displacement direction extending parallel to the x-y plane. Preferably, the at least one clamping element is linearly displaceable parallel to the x direction or parallel to the y direction.

A holding apparatus configured such that the fixing device comprises at least one fixing unit having a housing in which two clamping elements are arranged so as to be linearly displaceable in different directions ensures exact and reliable positioning and fixing of a workpiece adapter apparatus. Since the at least one fixing unit comprises a housing in which two clamping elements are arranged so as to be linearly displaceable in different directions, the fixing and positioning take place uniformly. As a result of the clamping elements being arranged in a common housing, in particular uniform hydraulic actuation is allowed. Since the two clamping elements are linearly displaceable in different directions, in particular in opposite directions, undesired tipping of the workpiece adapter apparatus is avoided. The two clamping elements are displaceable in opposite directions in particular parallel to the x direction or parallel to the y direction.

A holding configured such that the fixing device comprises at least two fixing units that each have at least one linearly displaceable clamping element, said fixing units being arranged on the main body in a manner spaced apart from one another ensures exact and reliable positioning and fixing of a workpiece adapter apparatus. The at least two fixing units are arranged on the main body in a manner spaced apart from one another in particular in the x direction and/or the y direction. This allows uniform fixing of the workpiece adapter apparatus. Preferably, each of the fixing units has two clamping elements, which are arranged in a housing and are linearly displaceable in different directions, in particular in opposite directions to one another.

A holding apparatus configured such that the fixing device comprises two fixing units that each have a housing, and the positioning elements are each arranged on one of the housings ensures exact and reliable positioning and fixing of a workpiece adapter apparatus. The positioning elements are arranged fixedly on the respective housing. Since the first positioning element is arranged on the housing of a first fixing unit and the second positioning element is arranged on the housing of a second fixing unit, it is possible to position the workpiece adapter apparatus exactly and reliably in the z direction. As a result of the positioning elements being arranged on the respective housing, the position of said positioning elements with respect to the at least one planar contact surface is defined exactly. The respective positioning element is formed preferably in one piece with the housing or with a housing part.

A holding apparatus configured such that the fixing device comprises at least one fixing unit having a housing on which the at least one planar contact surface is formed ensures exact and reliable positioning and fixing of a workpiece adapter apparatus. Since the at least one planar contact surface is formed on the housing of the at least one fixing unit, it is arranged close to the at least one linearly displaceable clamping element and the associated clamping surface. As a result, it is possible for the at least one contact surface to be pressed exactly against at least one mating contact surface of the workpiece adapter apparatus. Preferably, the fixing device has two fixing units, on the respective housings of which at least one planar contact surface is formed. Preferably, at least two planar contact surfaces are formed on each housing. The at least two planar contact surfaces formed on a housing are arranged preferably along a straight line, which extends in particular parallel to the x direction or parallel to the y direction. The two fixing units are arranged on the main body in a manner spaced apart from one another in the x direction and/or the y direction.

A holding apparatus configured such that the fixing device comprises at least one fixing unit having a housing, wherein two planar contact surfaces are formed on the housing, and in the housing, the at least one clamping element is arranged in a linearly displaceable manner and between the planar contact surfaces ensures exact and reliable positioning and fixing of a workpiece adapter apparatus. Since the at least one clamping element is arranged in a linearly displaceable manner between the two planar contact surfaces, uniform positioning and fixing of the workpiece adapter apparatus is ensured. The two planar contact surfaces are spaced far apart from one another, such that, as a result of the fixing and positioning in the z direction, tipping with respect to the x-y plane is low, and also, in the case of workpiece machining, high stability with regard to tipping relative to the x-y plane is ensured. Preferably, two clamping elements are mounted in the respective housing, said clamping elements being linearly displaceable in different directions, in particular in opposite directions. The two planar contact surfaces are formed preferably along a straight line on the housing, said straight line extending in particular parallel to the x direction or parallel to the y direction. The two clamping elements are linearly displaceable along this straight line in particular in opposite directions.

A holding apparatus configured such that the at least one clamping element forms a clamping surface that extends in a displacement direction and is arranged in particular in an inclined manner with respect to the at least one contact surface ensures exact and reliable positioning and fixing of a workpiece adapter apparatus. The clamping surface of the respective clamping element extends in the displacement direction such that, with increasing displacement of the clamping element, the workpiece adapter apparatus is increasingly pressed with at least one mating contact surface against the at least one contact surface. Preferably, the clamping surface is formed in a planar manner. The clamping surface extends in particular at an angle $\alpha$ to the at least one contact surface, wherein the following applies in particular for the angle $\alpha$: $5° \leq \alpha \leq 35°$, in particular $10° \leq \alpha \leq 30°$, and in particular $15° \leq \alpha \leq 25°$. The angle $\alpha$ is preferably $20°$.

A holding apparatus configured such that the at least one clamping element is hydraulically actuable ensures easy and reliable fixing of a workpiece adapter apparatus. The fixing device has at least one, in particular at least two fixing units. Each fixing unit comprises a hydraulically actuable piston-cylinder unit, by means of which the at least one clamping element is linearly displaceable. Preferably, the piston-cylinder unit, in particular a piston, has actuation surfaces that extend in an inclined manner with respect to an actuating direction, such that a linear movement of the piston-cylinder unit results in a linear displacement movement of two clamping elements. The two clamping elements are linearly displaced in particular in different directions, preferably in opposite directions, by the linear movement of the piston-cylinder unit. The respective piston-cylinder unit has for example a cylinder, in which a piston is linearly displaceable parallel to the z direction. Formed on the piston are two actuation surfaces, which extend at an angle $\beta$ to the z direction. The angle $\beta$ is for example $25°$. Formed at an end, arranged in the housing of the respective fixing unit, of the clamping elements is a mating actuation surface, which extends in a corresponding manner with respect to the associated actuation surface. As a result of a linear displacement of the piston parallel to the z direction, the clamping elements are linearly displaced in opposite directions parallel to the x-y plane. The actuation surfaces are formed preferably by an actuation element, which is fastened to the piston.

A holding apparatus comprising a monitoring device for monitoring the position of the at least one clamping element ensures reliable fixing of a workpiece adapter apparatus. Preferably, the monitoring device is formed in a pneumatic manner. To this end, a respective fixing unit of the fixing device has at least one monitoring channel, which is arranged such that it exhibits different states in a clamped position and an unclamped position of the fixing unit. The monitoring channel is for example in an open state in an unclamped position and in a closed state in a clamped position, or vice versa.

The invention is also based on the object of creating a simple workpiece adapter apparatus that allows exact and reliable positioning and fixing of a workpiece by means of a holding apparatus.

This object is achieved by a workpiece adapter apparatus for positioning and fixing a workpiece by means of a holding apparatus, having a support body, at least one fastening element for fixing the workpiece to the support body, said fastening element being arranged on a first side of the support body, a cylindrical positioning recess and a positioning slot, which are arranged on the support body for positioning on the holding apparatus in an x direction and a y direction extending perpendicularly to the x direction, at least one planar mating contact surface, which is arranged on a second side of the support body for positioning on the holding apparatus in a z direction extending perpendicularly to the x direction and to the y direction, and at least one mating clamping surface, arranged on the support body, for pressing the mating contact surface against the holding apparatus. For positioning the workpiece adapter apparatus on the holding apparatus, a cylindrical positioning recess and a positioning slot are arranged on the support body. A first positioning element of the holding apparatus engages in the positioning slot, whereas a second positioning element of the holding apparatus engages in the cylindrical positioning recess. The positioning slot allows a thermal linear expansion of the support body. As a result, exact positioning in the x direction and the y direction is possible by means of the cylindrical positioning recess and the positioning element arranged therein. By way of the positioning slot and the positioning element arranged therein, only the orientation in an x-y plane, which is defined by the x direction and the y direction, takes place. The cylindrical positioning recess and the positioning slot thus allow, in a simple manner, exact and robust positioning, with regard to thermal linear expansions, in the x and the y direction. For positioning in the z direction, the workpiece adapter apparatus has at least one planar mating contact surface, which bears against at least one planar contact surface of the holding apparatus. The positioning in the z direction thus takes place independently of the positioning in the x and the y direction. For fixing the workpiece adapter apparatus to the holding apparatus and for the final positioning in the z direction, at least one mating clamping surface is arranged on the support body, against which mating clamping surface, in the clamped state of the workpiece adapter apparatus, a clamping surface of at least one clamping element of the holding apparatus bears and presses the at least one planar mating contact surface against at least one contact surface of the holding apparatus. The workpiece adapter apparatus is positionable and fixable easily, exactly and reliably by means of the holding apparatus, such that a workpiece fastened to the workpiece adapter apparatus is positionable and fixable easily, exactly and reliably.

A workpiece adapter apparatus configured such that the cylindrical positioning recess and the positioning slot are spaced apart in the x direction and the positioning slot extends in the x direction ensures exact and reliable positioning and fixing of a workpiece by means of a holding apparatus. Since the cylindrical positioning recess and the positioning slot are spaced apart in the x direction, exact orientation of the workpiece adapter apparatus defined by means of the positioning recess is achieved. The orientation is all the more exact, the further apart the positioning recess and the positioning slot are from one another in the x direction. As a result of temperature fluctuations and a resultant thermal linear expansion of the support body, the cylindrical positioning recess and the positioning slot are not at a constant spacing, however. Since the positioning slot extends in the x direction, this allows length compensation of the support body.

A workpiece adapter apparatus configured such that the cylindrical positioning recess is arranged between two planar mating contact surfaces, wherein the planar mating contact surfaces are spaced apart from one another in particular in the y direction, ensures exact and reliable positioning and fixing of a workpiece by means of a holding apparatus. The mating contact surfaces are arranged in particular along a straight line, which extends parallel to the y direction. Preferably, the mating contact surfaces are arranged in a common plane. The common plane extends in particular parallel to the x-y plane. Since the cylindrical positioning recess is arranged between two planar mating contact surfaces, the mating contact surfaces are spaced far apart from one another. As a result, the workpiece adapter apparatus is positionable exactly in the z direction, since tipping relative to the x-y plane is reliably avoidable. In addition, the workpiece adapter apparatus has, in a clamped state, high stability with respect to tipping relative to the x-y plane during the machining of a workpiece.

A workpiece adapter apparatus configured such that the positioning slot is arranged between two planar mating contact surfaces, wherein the planar mating contact surfaces are spaced apart from one another in particular in the y direction, ensures exact and reliable positioning and fixing of a workpiece by means of a holding apparatus. The mating contact surfaces are arranged in particular along a straight line, which extends parallel to the y direction. Preferably, the mating contact surfaces are arranged in a common plane. The common plane extends in particular parallel to the x-y plane. Since the positioning slot is arranged between two planar mating contact surfaces, these are spaced far apart from one another. As a result, exact positioning in the z direction is ensured, since tipping relative to the x-y plane is reliably avoided, and also high stability with respect to tipping relative to the x-y plane is achieved during the machining of a workpiece.

A workpiece adapter apparatus configured such that the at least one mating clamping surface is arranged in the z direction above the at least one mating contact surface ensures exact and reliable positioning and fixing of a workpiece by means of a holding apparatus. Since the at least one mating clamping surface is arranged in the z direction immediately above the at least one mating contact surface, the workpiece adapter apparatus is pressed reliably against at least one contact surface of the holding apparatus by means of at least one clamping element of the holding apparatus and the associated clamping surface. Preferably, the workpiece adapter apparatus has at least two, in particular at least four mating contact surfaces, which are arranged in a common plane and are spaced apart from one another in the x direction and/or the y direction. The common plane extends in particular parallel to the x-y plane. The workpiece adapter apparatus is pressable exactly and reliably with the associated mating contact surface against the at least one contact surface of the holding apparatus by means of the respective mating clamping surface.

A workpiece adapter apparatus configured such that the at least one mating clamping surface extends in an inclined manner with respect to the at least one mating contact surface ensures exact and reliable positioning and fixing of a workpiece by means of a holding apparatus. Since the at least one mating clamping surface extends in an inclined manner with respect to the mating contact surface, the workpiece adapter apparatus is increasingly pressed with the at least one mating contact surface against at least one contact surface of the holding apparatus by means of a linear displacement of the at least one clamping element of a holding apparatus, and is thus positioned and fixed exactly in the z direction. The at least one mating clamping surface extends in particular at an angle α relative to the x-y plane and/or the at least one mating contact surface, wherein the following applies in particular for the angle α: 5°≤α≤35°, in particular 10°≤α≤30°, and in particular 15°≤α≤25°. The angle α is preferably 20°.

The invention is furthermore based on the object of creating a simple holding apparatus/workpiece adapter apparatus arrangement that allows exact and reliable positioning and fixing of a workpiece.

This object is achieved by a holding apparatus/workpiece adapter apparatus arrangement having a holding apparatus according to the invention, and having a workpiece adapter apparatus according to the invention, wherein for positioning in the x direction and the y direction, the positioning elements are arranged in the positioning recess and the positioning slot, and for positioning in the z direction and for fixing, the at least one clamping surface bears against the at least one mating clamping surface, and the at least one contact surface is pressed against the at least one mating contact surface. The advantages of the holding apparatus/ workpiece adapter apparatus arrangement according to the invention correspond to the above-described advantages of the holding apparatus according to the invention and of the workpiece adapter apparatus according to the invention. For exact positioning in the x direction and the y direction, the first positioning element is arranged in the positioning slot and the second positioning element is arranged in the cylindrical positioning recess. As a result, the workpiece adapter apparatus and the workpiece fastened there are positioned exactly and reliably in the x and the y direction. The positioning slot allows length compensation in the event of a thermal linear expansion of the support body of the workpiece adapter apparatus. For positioning in the z direction, the workpiece adapter apparatus is pressed against the associated at least one contact surface of the holding apparatus by means of the at least one mating contact surface. To this end, the at least one clamping element is linearly displaced such that the associated clamping surface bears against the at least one mating clamping surface and causes the at least one mating contact surface to be pressed against the at least one contact surface in the z direction. Therefore, the positioning in the z direction takes place independently of the positioning in the x and the y direction. As a result of the fixing by means of the at least one clamping element, exact positioning in the z direction takes place at the same time.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
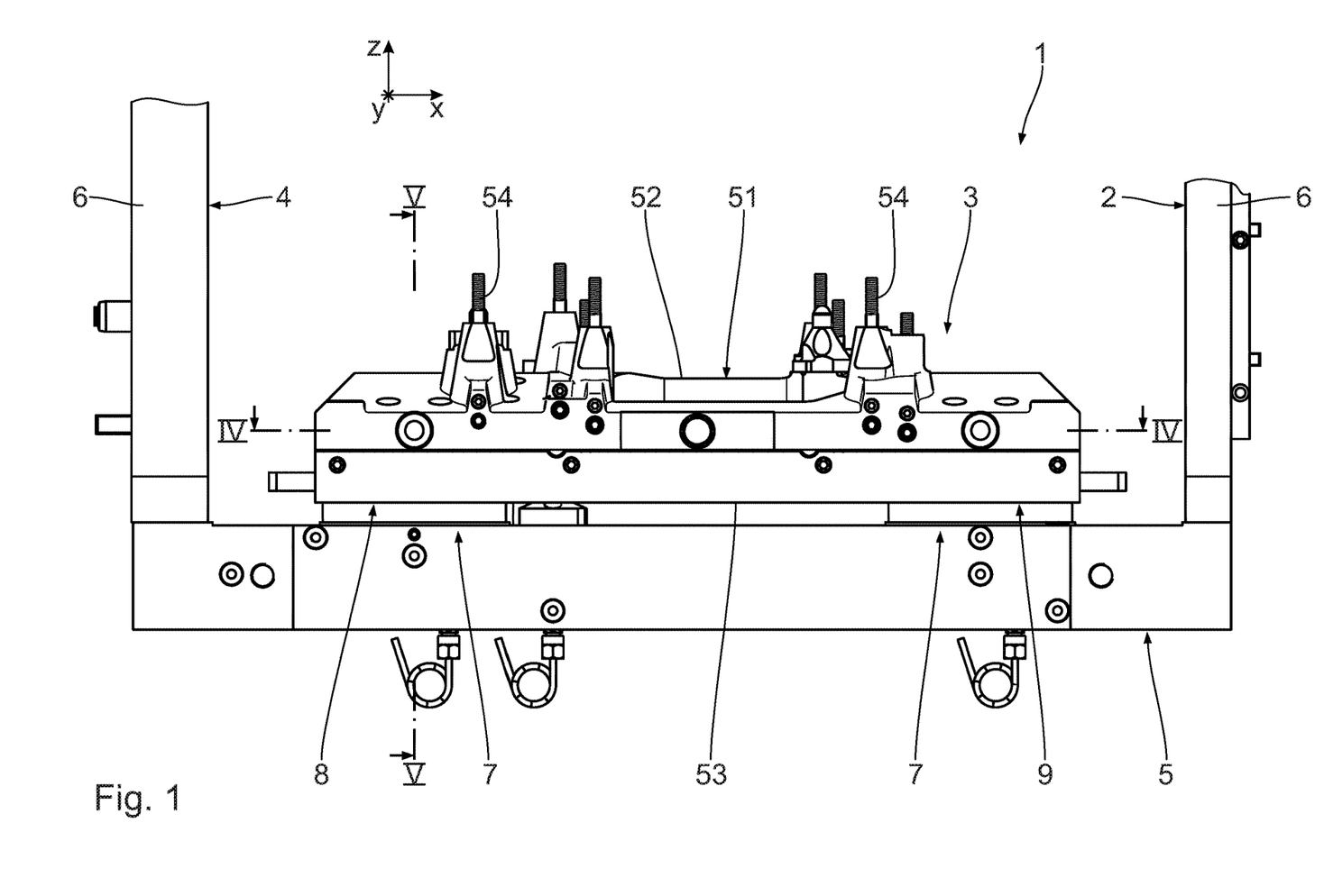
FIG. 1 is a side view of a holding apparatus/workpiece adapter apparatus arrangement having a workpiece adapter apparatus positioned and fixed by means of a holding apparatus.

A holding apparatus/workpiece adapter apparatus arrangement 1 comprises a holding apparatus 2 and a workpiece adapter apparatus 3. The holding apparatus/workpiece adapter apparatus arrangement 1 is for example part of a machine tool for machining a workpiece. The workpiece to be machined is for example an engine block of an internal combustion engine.

Figure 2:
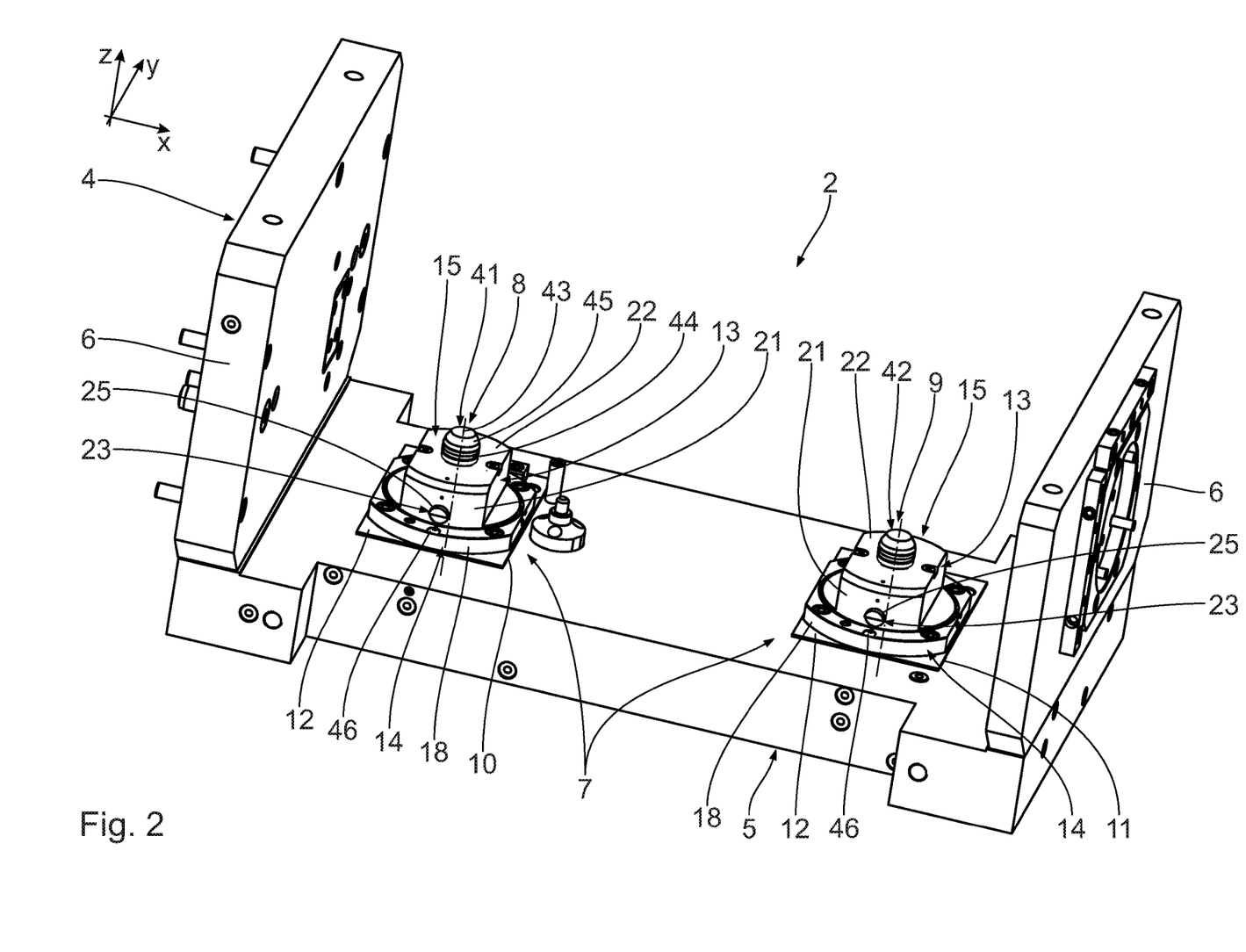
FIG. 2 is a perspective view of the holding device in FIG. 1 without the workpiece adapter apparatus.

The holding apparatus 2 serves for positioning and fixing the workpiece adapter apparatus 3. To this end, the holding apparatus 2 is fastened for example to a positioning apparatus of a machine tool. The holding apparatus 2 comprises a main body 4, which is formed by a base plate 5 and fastening plates 6 fastened to the ends thereof. The base plate 5 extends in an x direction and a y direction extending perpendicularly to the latter. By contrast, the fastening plates 6 extend in the y direction and in a z direction extending perpendicularly to the x and the y direction. The x, y and z directions form a Cartesian coordinate system.

Figure 4:
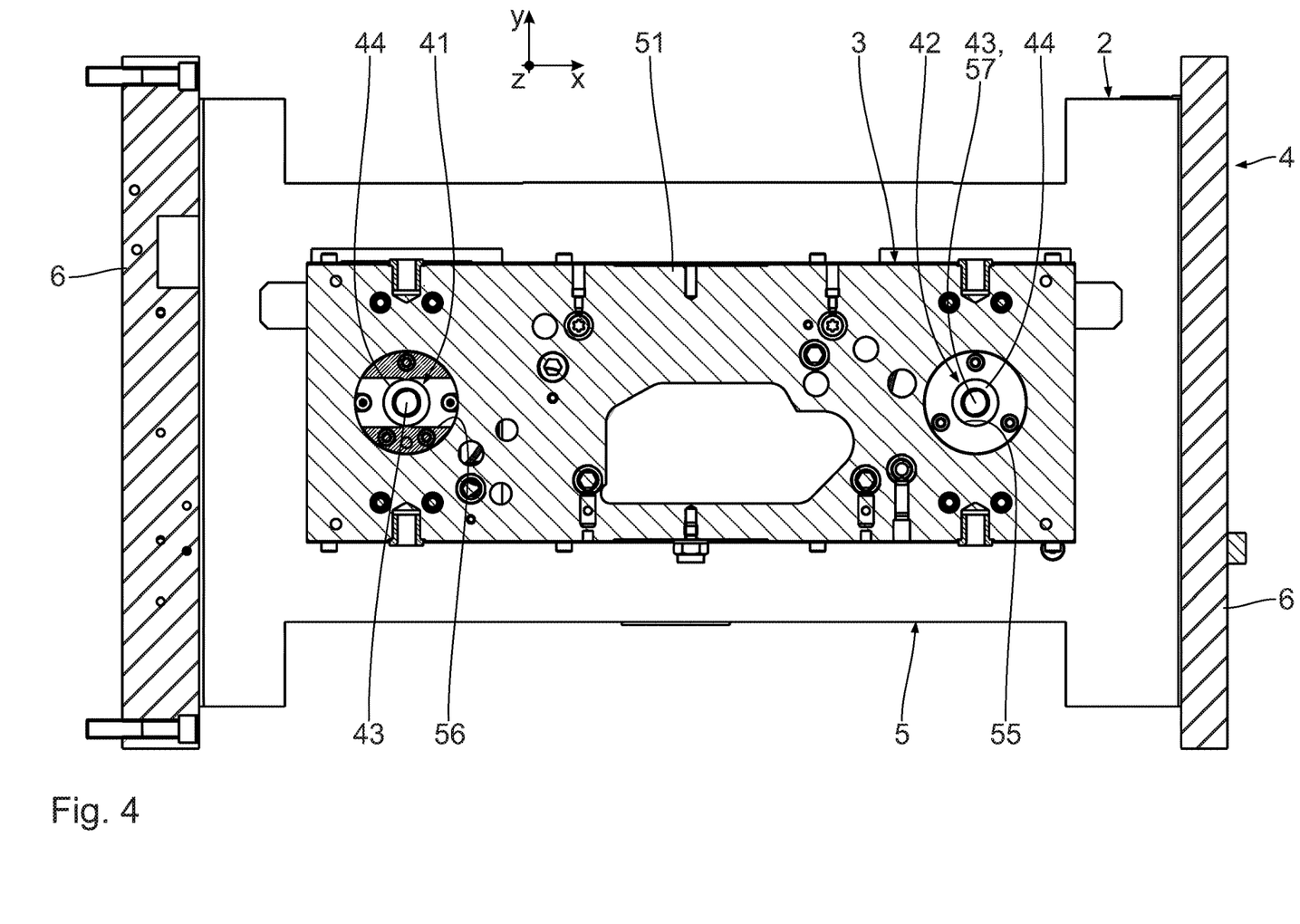
FIG. 4 is a sectional view of the holding apparatus/ workpiece adapter apparatus arrangement along the section line IV-IV in FIG. 1.

The holding apparatus 2 comprises a fixing device 7 having two fixing units 8, 9, which are fastened to the base plate 5 in a manner spaced apart from one another in the x direction. For receiving the fixing units 8, 9, the base plate 5 has through-openings 10, 11, in which the fixing units 8, 9 are partially received. The fixing units 8, 9 each comprise a connection plate 12 and a housing 13, fastened thereto, having a first, lower housing part 14 and a second, upper housing part 15. The respective connection plate 12 is fastened in the associated through-opening 10, 11. The connection plates 12 have a respective connection-plate through-opening 16, into which the respective first housing part 14 partially extends with a first annular portion 17. A second annular portion 18 of the respective first housing part 14 bears against the respective connection plate 12 on an upper side 19 thereof. The respective second housing part 15 is fastened to the associated first housing part 14 and forms a respective interior space 20 therewith. To this end, the respective second housing part has an encircling peripheral portion 21 and a plate-like cover portion 22 fastened integrally thereto.

Figure 5:
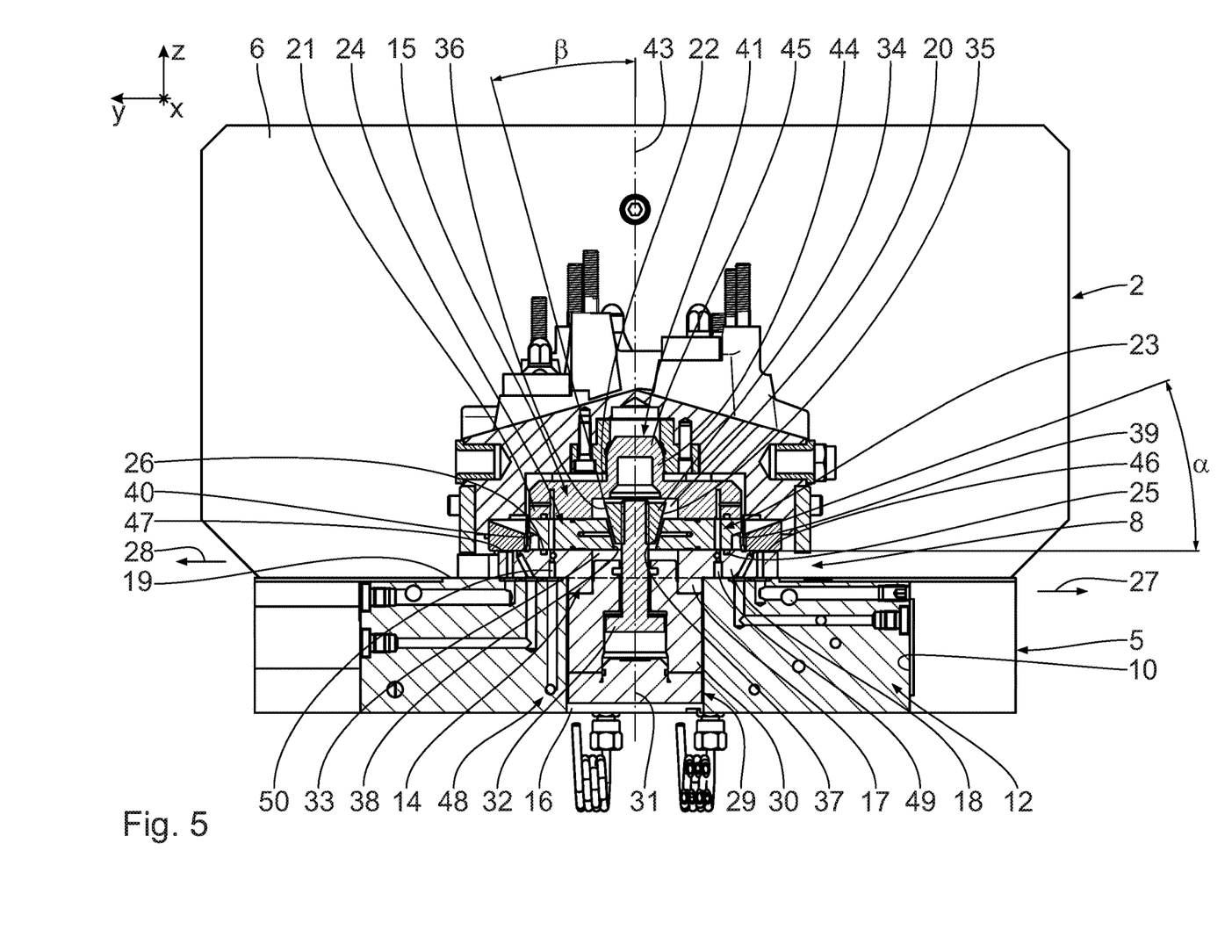
FIG. 5 is a sectional view of the holding apparatus/ workpiece adapter apparatus arrangement along the section line V-V in FIG. 1 in an unclamped state.

Arranged in the interior space 20 of the respective housing 13 are two clamping elements 23, 24, which extend out of the respective housing 13 through housing through-openings 25, 26 formed in the annular portion 21. The housing through-openings 25, 26 are arranged in a manner aligned with one another along a straight line, which extends parallel to the y direction, such that the clamping elements 23, 24 are displaceable linearly and parallel to the y direction in opposite displacement directions 27, 28. The clamping elements 23, 24 are thus displaceable parallel to an x-y plane, which is defined by the x direction and the y direction.

Figure 6:
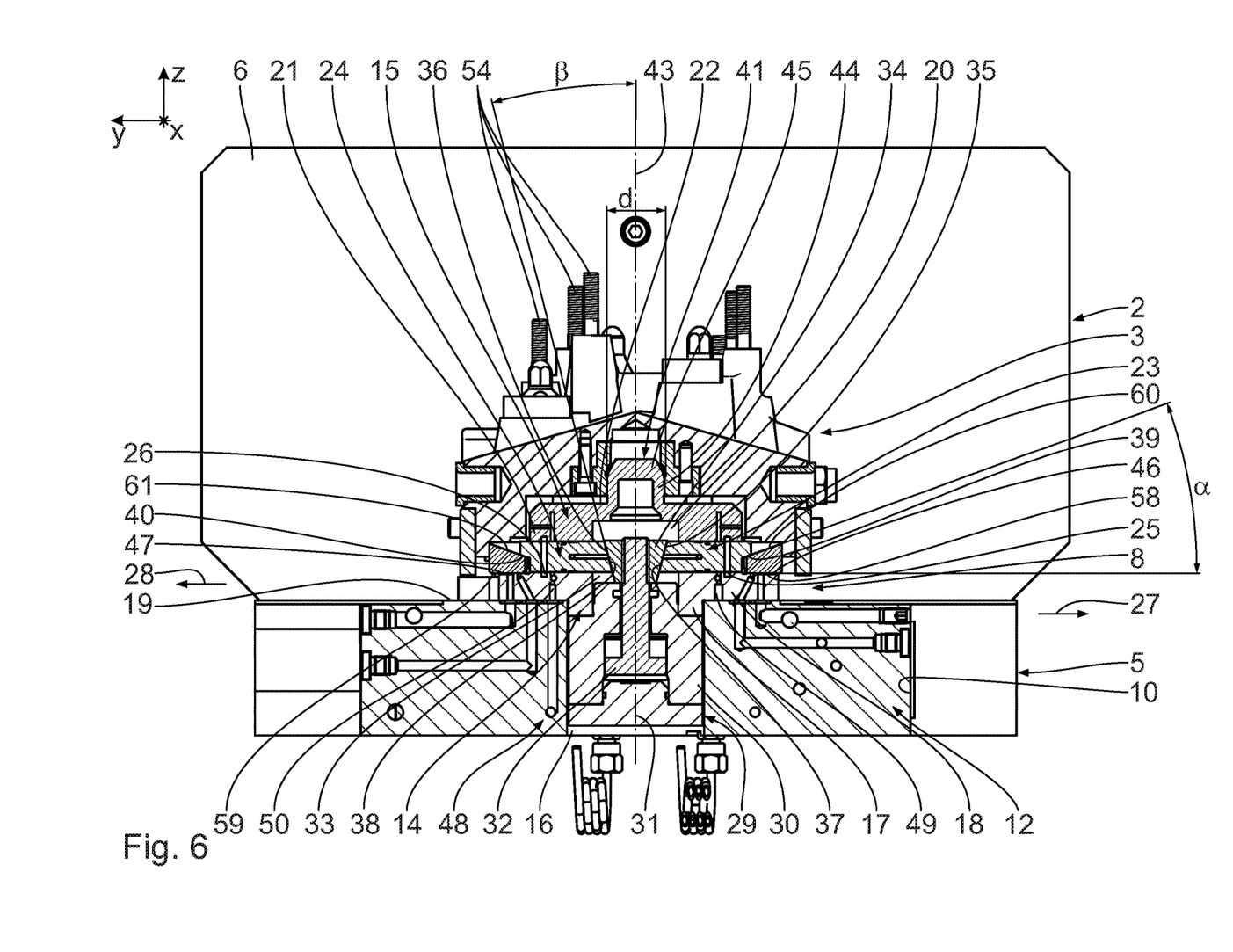
FIG. 6 is a sectional view of the holding apparatus/ workpiece adapter apparatus arrangement as per FIG. 5 in a clamped state.

For displacing the clamping elements 23, 24, the respective fixing unit 8, 9 has a piston-cylinder unit 29 having a cylinder 30 and a piston 32 that is displaceable therein along a piston axis 31. The piston axis 31 defines an actuating direction of the piston 32. The respective cylinder 30 is arranged in the connection-plate through-opening 16 and extends into a lower housing through-opening 33, which is formed in the respective first housing part 14, such that the piston 32 extends into the interior space 20. Formed on the end of the piston 32 is an actuation element 34 having two mutually opposite actuation surfaces 35, 36. The actuation surfaces 35, 36 enclose an angle $\beta$ with the piston axis 31 and each face one of the clamping elements 23, 24. The following applies in particular for the angle $\beta$: $10°\leq\beta\leq40°$, in particular $15°\leq\beta\leq35°$ and in particular $20°\leq\beta\leq30°$. The angle $\beta$ is for example 25°. The respective piston axis 31 extends parallel to the z direction. For linearly displacing the clamping elements 23, 24, the latter have mating actuation surfaces 37, 38, which face the actuation surfaces 35, 36 and enclose an angle $\beta$ with the piston axis 31 in a corresponding manner. The piston-cylinder units 29 are usually hydraulically actuable.

For clamping the workpiece adapter apparatus 3, the clamping elements 23, 24 each have a clamping surface 39, 40, which is formed at one end of the respective clamping element 23, 24 opposite the respective mating actuation surface 37, 38. The clamping surfaces 39, 40 face the first housing part 14 and formed in a planar manner. The clamping surfaces 39, 40 extend at an angle $\alpha$ to the x-y plane, wherein the following applies for the angle $\alpha$: $5°\leq\alpha\leq35°$, in particular $10°\leq\alpha\leq30°$ and in particular $15°\leq\alpha\leq25°$. The angle $\alpha$ is for example 20°. The clamping surfaces 39, 40 thus extend in an inclined manner at the angle $\alpha$ to the respective displacement direction 27, 28.

For positioning the workpiece adapter apparatus 3 in the x direction and the y direction, the holding apparatus 2 comprises a first positioning element 41 and a second positioning element 42. The positioning elements 41, 42 are formed in a peg-like manner. The positioning elements 41, 42 are arranged on or fastened to the cover portion 22 of the respective fixing unit 8, 9 and in particular form in one piece with the respective cover portion 22. The positioning elements 41, 42 have a longitudinal center axis 43 that extends parallel to the z direction. The positioning elements 41, 42 each have a cylindrical positioning portion 44 and a frusto-conical introduction portion 45, which are formed concentrically with the longitudinal center axis 43. By means of the fixing units 8, 9, the positioning elements 41, 42 are thus fastened to the main body 4. The positioning portions 44 have a diameter d, wherein the following applies for the diameter d: $15\text{ mm}\leq d\leq45\text{ mm}$, in particular $20\text{ mm}\leq d\leq40\text{ mm}$, and in particular $25\text{ mm}\leq d\leq35\text{ mm}$.

For positioning the workpiece adapter apparatus 3 in the z direction, two planar contact surfaces 46, 47 are formed on each of the fixing units 8, 9. The contact surfaces 46, 47 are formed in a common plane, which extends parallel to the x-y plane. The contact surfaces 46, 47 are formed on the second annular portion 18 of the respective first housing part 14 and are located beneath the clamping surfaces 39, 40, as seen in the z direction. The clamping surfaces 39, 40 thus extend at an angle $\alpha$ relative to the associated contact surfaces 46, 47, such that, as a result of a linear displacement of the clamping elements 23, 24, the workpiece adapter apparatus 3 is pressable against the planar contact surfaces 46, 47. The clamping elements 23, 24 are thus arranged along a straight line, extending parallel to the y direction, substantially between the contact surfaces 46, 47.

The holding apparatus 2 also has a monitoring device 48, which serves for monitoring the position of the clamping elements 23, 24. By means of the monitoring device 48, a clamped position or an unclamped position of the clamping elements 23, 24 is detectable. The monitoring device 38 is formed in a pneumatic manner. To this end, a monitoring channel 49, 50 is formed in the respective fixing unit 8, 9 for each of the clamping elements 23, 24. The respective monitoring channel 49, 50 extends through the connection plate 12 and the associated housing 13 and extends further through the respective clamping element 23, 24, such that in the unclamped position, the respective monitoring channel 49, 50 is not interrupted, and in the clamped position, the respective monitoring channel 49, 50 is interrupted by the clamping elements 23, 24 on account of the linear shifting thereof. The monitoring device 48 has a pneumatic pump (not illustrated in more detail), by means of which air is able to be delivered through the monitoring channels 49, 50. By means of a pressure measuring sensor (not illustrated in more detail), a pressure in the monitoring channels 49, 50 is able to be measured. By means of the measured pressure, the clamped position or the unclamped position of the clamping elements 23, 24 is detectable.

Figure 3:
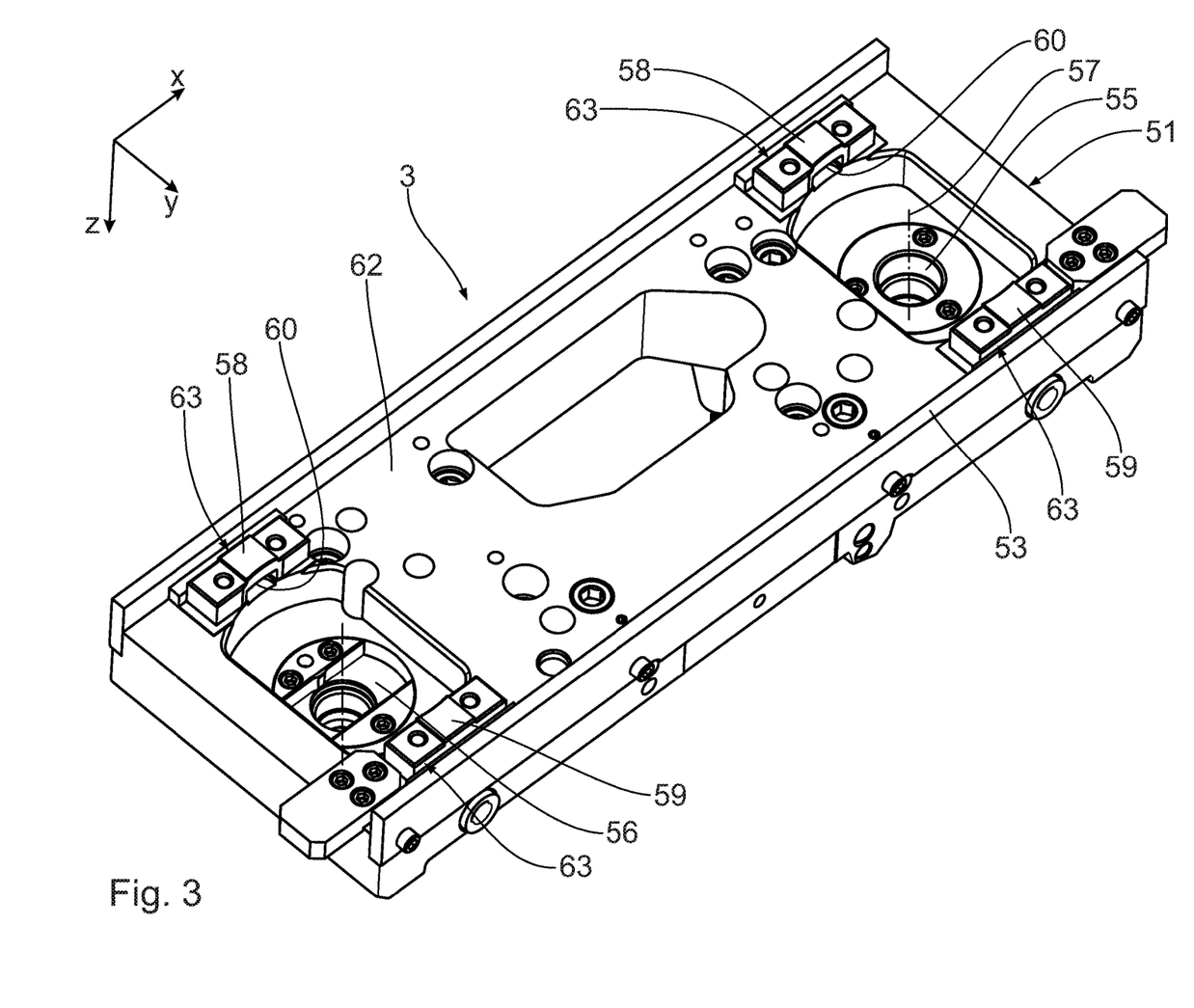
FIG. 3 is a perspective view of an underside of the workpiece adapter apparatus in FIG. 1.

The workpiece adapter apparatus 3 serves for positioning and fixing a workpiece to be machined, by means of the holding apparatus 2. The workpiece adapter apparatus 3 has a support body 51 having a first side 52 facing away from the holding apparatus 2 and a second side 53 facing the holding apparatus 2. Arranged in a conventional manner on the first side 52 are a plurality of fastening elements 54 for fixing the workpiece to be machined. On the second side 53, a cylindrical positioning recess 55 and a positioning slot 56 are formed in the support body 51.

The directions specified in the following relate to the workpiece adapter apparatus 3 when the latter is clamped on the holding apparatus 2, i.e. to the Cartesian coordinate system defined in conjunction with the holding apparatus 2 and to the x, y and z directions. The cylindrical positioning recess 55 has a longitudinal center axis 57 extending parallel to the z direction and is adapted to the associated positioning element 42 such that the latter is able to be positioned as exactly as possible in the positioning recess 55. The positioning slot 56 is arranged in a manner spaced apart from the positioning recess 55 in the x direction and is aligned with the positioning recess 55 in the y direction. In order to allow length compensation as a result of a thermal linear expansion of the support body 51, the positioning slot 56 extends parallel to the x direction. A width of the positioning slot 56 in the y direction is adapted to the associated positioning element 41 such that the latter is able to be positioned as exactly as possible in the positioning slot 56.

For positioning the workpiece adapter apparatus 3 in the z direction, the latter has mating contact surfaces 58, 59, which are each associated in pairs with the positioning recess 55 and the positioning slot 56. The mating contact surfaces 58, 59 are arranged in a common plane, which extends parallel to the x-y plane. In each case two mating contact surfaces 58, 59 are arranged next to the positioning recess 55 and the positioning slot 56 along a straight line extending parallel to the y direction, such that the positioning recess 55 and the positioning slot 56 are each located between two mating contact surfaces 58, 59. The mating contact surfaces 58, 59 are arranged on the second side 53 of the support body 51.

For clamping the workpiece adapter apparatus 3, mating clamping surfaces 60, 61 are arranged on the second side 53 of the support body 51, said mating clamping surfaces 60, 61 each being associated with a mating contact surface 58, 59. The mating clamping surfaces 60, 61 are arranged above the respectively associated mating contact surface 58, 59 in the z direction. The mating clamping surfaces 60, 61 are thus arranged, in a manner corresponding to the mating contact surfaces 58, 59, next to the positioning recess 55 and the positioning slot 56 along a straight line extending parallel to the y direction, such that the positioning recess 55 and the positioning slot 56 are each arranged between two mating clamping surfaces 60, 61. The mating clamping surfaces 60, 61 are formed in a planar manner and, for pressing the mating contact surfaces 58, 59 against the associated contact surfaces 46, 47, extend at the angle α to the mating contact surfaces 58, 59.

For forming the mating contact surfaces 58, 59 and the mating clamping surfaces 60, 61, the support body 51 has a support plate 62, to which positioning/fixing elements 63 are fastened. On each of the positioning/fixing elements 63, a mating contact surface 58 or 59 and a mating clamping surface 60 or 61 are formed in the described manner.

If the workpiece adapter apparatus 3 has been fixed by means of the holding apparatus 2 and is positioned thereon, the holding apparatus 2 and the workpiece adapter apparatus 3 form the holding apparatus/workpiece adapter apparatus arrangement 1. In this positioned and fixed state, the first positioning element 41 is arranged in the positioning slot 56 and the second positioning element 42 is arranged in the positioning recess 55. Furthermore, the clamping elements 23, 24 have been displaced in the respective displacement direction 27, 28, such that the clamping surfaces 39, 40 bear against the associated mating clamping surfaces 60, 61 and the workpiece adapter apparatus 3 is pressed with the mating contact surfaces 58, 59 against the associated contact surfaces 46, 47 and is positioned in the z direction.

The holding apparatus/workpiece adapter apparatus arrangement 1 functions as follows:

A workpiece to be machined is positioned on and fixed to the workpiece adapter apparatus 3 by means of the fastening elements 46. The workpiece adapter apparatus 3 is subsequently positioned on the holding apparatus 2 such that the first positioning element 41 engages in the positioning slot 56 and the second positioning element 42 engages in the positioning recess 55, and the mating contact surfaces 58, 59 bear against the associated contact surfaces 46, 47. As a result of the positioning elements 41, 42 engaging in the positioning recess 55 and the positioning slot 56, the workpiece adapter apparatus 3 is positioned on the holding apparatus 2 in the x and the y direction. In addition, the positioning slot 56 allows length compensation in the event of thermal linear expansions of the support body 51. For fixing the workpiece adapter apparatus 3, the first clamping elements 23 are linearly displaced in the displacement direction 27 and the second clamping elements 24 are linearly displaced in the displacement direction 28, such that the associated clamping surfaces 39, 40 are pressed against the mating clamping surfaces 60, 61. As a result, the workpiece adapter apparatus 3 is fixed by means of the holding apparatus 2, and also the workpiece adapter apparatus 3 is pressed with the mating contact surfaces 58, 59 against the associated contact surfaces 46, 47, with the result that final positioning in the z direction takes place. The positioning in the z direction thus takes place independently of the positioning in the x and the y direction.

For clamping, the clamping elements 23, 24 are actuated by means of the piston-cylinder units 29. The respective piston 32 is pulled in the direction of the associated cylinder 30, with the result that the respective actuation element 34 exerts with the actuation surfaces 35, 36 a spreading force on the mating actuation surfaces 37, 38 of the clamping elements 23, 24 and linearly displaces the latter in the displacement directions 27, 28. As a result of the clamping elements 23, 24 being displaced, the monitoring channels 49, 50 are interrupted, with the result that the air pressure increases. This is measured by the monitoring device 48, such that the clamped position or the unclamped position is detected.

In order to release the workpiece adapter apparatus 3, the pistons 32 are extended out of the associated cylinder 30, with the result that a spreading force is no longer exerted on the clamping elements 23, 24 by the respective actuation element 34. On account of the clamping surfaces 39, 40 extending in an inclined manner, the first clamping elements 23 are displaced automatically in the displacement direction 28 and the second clamping elements 24 in the displacement direction 27, with the result that the workpiece adapter apparatus 3 is released. The workpiece adapter apparatus 3 is removed from the holding apparatus 2, such that a further workpiece to be machined, which is fixed to a further workpiece adapter apparatus 3, can be clamped by means of the holding apparatus 2.

The holding apparatus 2 and the workpiece adapter apparatus 3 allow exact and reliable positioning and fixing of a workpiece to be machined. The positioning elements 41, 42 have a fitting tolerance in the positioning recess 55 and the positioning slot 56 of between 0.003 μm and 0.005 μm, in particular 0.004 μm. The holding apparatus/workpiece adapter apparatus arrangement 1 is resistant to contamination and thermal linear expansions and has a high level of stiffness. The positioning elements 41, 42 also allow in particular absorption of transverse forces that arise during workpiece machining A clamped position and an unclamped position of the holding apparatus/workpiece adapter apparatus arrangement 1 is reliably pneumatically detectable. The holding apparatus/workpiece adapter apparatus arrangement 1 is also of simple structure and allows rapid loading and unloading or clamping and unclamping of a workpiece to be machined and also free accessibility to a workpiece to be machined.

The workpiece adapter apparatus 3 is clamped via a sliding jaw principle against a flat contact surface, with the result that positioning in the z direction takes place. Separately therefrom, the positioning in the x and y directions takes place by means of the positioning elements 41, 42 and the positioning recess 55 and the positioning slot 56, respectively.

While specific embodiments of the invention have been shown and described in detail to illustrate the application of the principles of the invention, it will be understood that the invention may be embodied otherwise without departing from such principles.

The invention claimed is:

1. A clamping device comprising a workpiece adapter apparatus and a holding apparatus, the holding apparatus being configured to position and fix the workpiece adapter apparatus, the holding apparatus comprising:
 a main body;
 two positioning elements for positioning the workpiece adapter apparatus in an x direction and a y direction extending perpendicularly to the x direction, the two positioning elements being arranged on the main body;

at least one planar contact surface for positioning the workpiece adapter apparatus in a z direction extending perpendicular to the x direction and to the y direction; and a fixing device for pressing the workpiece adapter apparatus against the at least one planar contact surface, the fixing device being arranged on the main body, wherein the fixing device comprises at least one fixing unit having a housing, a first linearly displaceable clamping element with a first clamping surface and a second linearly displaceable clamping element with a second clamping surface being arranged in the housing so as to be linearly displaceable in different directions, wherein the two positioning elements are formed at least partially in a cylindrical manner such that positioning in the z direction takes place independently of the positioning in the x direction and in the y direction.

2. The clamping device as claimed in claim 1, wherein the fixing device comprises at least two fixing units, each of the at least two fixing units having at least two linearly displaceable clamping elements, the at least two fixing units being arranged on the main body in a manner spaced apart from one another.

3. The clamping device as claimed in claim 1, wherein the fixing device comprises two fixing units, each of the two fixing units having a housing to provide at least a plurality of housings, and each of the two positioning elements is arranged on one of the housings.

4. The clamping device as claimed in claim 1, wherein the fixing device comprises at least one fixing unit having a housing, the at least one planar contact surface being formed on the housing.

5. The clamping device as claimed in claim 1, wherein the fixing device comprises at least one fixing unit having a housing, wherein a first planar contact surface and a second planar contact surface are formed on the housing, and the first linearly displaceable clamping element and the second linearly displaceable clamping element are arranged in a linearly displaceable manner between the first planar contact surface and the second planar contact surface.

6. The clamping device as claimed in claim 1, wherein the respective clamping surface extends in a displacement direction.

7. The clamping device as claimed in claim 6, wherein the respective clamping surface is arranged in an inclined manner with respect to the at least one planar contact surface.

8. The clamping device as claimed in claim 1, wherein the respective clamping element is hydraulically actuatable.

9. The clamping device as claimed in claim 1, further comprising:

a monitoring device for monitoring a position of the respective linearly displaceable clamping element.

10. A clamping device comprising a workpiece adapter apparatus and a holding apparatus, the workpiece adapter apparatus being configured to position and fix a workpiece by means of the holding apparatus, the workpiece adapter apparatus comprising:

a support body;

at least one fastening element for fixing the workpiece to the support body, the fastening element being arranged on a first side of the support body;

a cylindrical positioning recess and a positioning slot, the cylindrical positioning recess and the positioning slot being arranged on the support body for positioning on the holding apparatus in an x direction and a y direction extending perpendicular to the x direction;

at least one planar mating contact surface arranged on a second side of the support body for positioning on the holding apparatus in a z direction extending perpendicular to the x direction and to the y direction; and at least one mating clamping surface for pressing the at least one planar mating contact surface against the holding apparatus, the at least one mating clamping surface being arranged on the support body.

11. The clamping device as claimed in claim 10, wherein the cylindrical positioning recess and the positioning slot are spaced apart in the x direction and the positioning slot extends in the x direction.

12. The clamping device as claimed in claim 10, wherein the cylindrical positioning recess is arranged between two planar mating contact surfaces, wherein the planar mating contact surfaces are spaced apart from one another.

13. The clamping device as claimed in claim 12, wherein the planar mating contact surfaces are spaced apart from one another in the y direction.

14. The clamping device as claimed in claim 10, wherein the positioning slot is arranged between two planar mating contact surfaces, wherein the two planar mating contact surfaces are spaced apart from one another.

15. The clamping device as claimed in claim 14, wherein the planar mating contact surfaces are spaced apart from one another in the y direction.

16. The clamping device as claimed in claim 10, wherein the at least one mating clamping surface is arranged in the z direction above the at least one mating contact surface.

17. The clamping device as claimed in claim 10, wherein the at least one mating clamping surface extends in an inclined manner with respect to the at least one planar mating contact surface.

18. The clamping device as claimed in claim 10, wherein the slot extends in the x direction and the recess is oriented in the z direction.

19. The clamping device as claimed in claim 10, wherein the slot comprises a slot longitudinal axis, the slot longitudinal axis being parallel to the x direction, the recess comprising a recess longitudinal axis, the recess longitudinal axis being parallel to the z direction.

20. A clamping device comprising a workpiece adapter apparatus and a holding apparatus, the holding apparatus being configured to position and fix the workpiece adapter apparatus, the holding apparatus comprising: a main body;

two positioning elements for positioning the workpiece adapter apparatus in an x direction and a y direction extending perpendicularly to the x direction, the two positioning elements being arranged on the main body;

at least one planar contact surface for positioning the workpiece adapter apparatus in a z direction extending perpendicular to the x direction and to the y direction;

a fixing device for pressing the workpiece adapter apparatus against the at least one planar contact surface, the fixing device being arranged on the main body, wherein the fixing device comprises at least one fixing unit having a housing, a first linearly displaceable clamping element with a first clamping surface and a second linearly displaceable clamping element with a second clamping surface being arranged in the housing so as to be linearly displaceable in different directions, wherein the two positioning elements are formed at least partially in a cylindrical manner such that positioning in the z direction takes place independently of the positioning in the x direction and in the y direction; and the workpiece adapter apparatus comprising a support body, at least one fastening element for fixing a workpiece to the support body, a cylindrical positioning recess and a positioning slot, at least one planar mating contact surface arranged on a second side of the support body for positioning on the holding apparatus in a z direction extending perpendicular to the x direction and to the y direction and at least one mating clamping surface for pressing the at least one planar mating contact surface against the holding apparatus, the fastening element being arranged on a first side of the support body, the cylindrical positioning recess and the positioning slot being arranged on the support body for positioning on the holding apparatus in an x direction and a y direction extending perpendicular to the x direction, the at least one mating clamping surface being arranged on the support body, wherein, for positioning in the x direction and the y direction, the two positioning elements are arranged in the cylindrical positioning recess and the positioning slot, and, for positioning in the z direction and for fixing, the respective clamping surface bears against the at least one mating clamping surface and the at least one planar contact surface is pressed against the at least one mating contact surface.

* * * * *